United States Patent
Frankowski et al.

(10) Patent No.: US 6,464,604 B1
(45) Date of Patent: Oct. 15, 2002

(54) TENSIONER

(75) Inventors: Marek Frankowski, Stroud; Jorma J. Lehtovaara, Etobicoke; Jacek Stepniak, Stroud; Klaus K. Bytzek, Schomberg; Witold Gajewski, Richmond Hill, all of (CA)

(73) Assignee: Litens Automotive Partnership, Woodbridge (CA)

( * ) Notice: Subject to any disclaimer, the term of this patent is extended or adjusted under 35 U.S.C. 154(b) by 0 days.

(21) Appl. No.: 09/456,307

(22) Filed: Dec. 8, 1999

Related U.S. Application Data

(60) Provisional application No. 60/111,378, filed on Dec. 8, 1998.

(51) Int. Cl.$^7$ ................................................. F16H 7/14
(52) U.S. Cl. ........................ 474/117; 474/112; 474/135
(58) Field of Search .............................. 474/112, 110, 474/113, 117, 133, 135, 136, 137, 138

(56) References Cited

U.S. PATENT DOCUMENTS

| | | | |
|---|---|---|---|
| 4,583,962 A | | 4/1986 | Bytzek et al. |
| 4,767,383 A | * | 8/1988 | St. John ..................... 474/133 |
| 4,906,222 A | | 3/1990 | Henderson |
| 5,064,405 A | * | 11/1991 | St. John ..................... 474/133 |
| 5,171,188 A | | 12/1992 | Lardrot et al. |
| 5,273,494 A | | 12/1993 | Varin |
| 5,419,742 A | * | 5/1995 | Shimaya ..................... 474/112 |
| 5,591,094 A | | 1/1997 | Farmer et al. |
| 5,919,107 A | * | 7/1999 | Stepniak ..................... 474/112 |

FOREIGN PATENT DOCUMENTS

| | | |
|---|---|---|
| EP | 478 267 | 4/1992 |
| EP | 479 647 | 4/1992 |
| FR | 962.341 | 6/1950 |

OTHER PUBLICATIONS

Nawrocki W T et al., "Sizing Spring Tensioners for V–Belt Drives", Machine Design, US, Penton, Inc. Cleveland, vol. 62, No. 1, Jan. 11, 1990, p. 132, 134, 136 13 XP000095637, ISSN: 0024–9114, p. 136.

Bryan P. Collins, Submission of Prior Art, Jun. 22, 2000, pp. 1–2.

\* cited by examiner

*Primary Examiner*—Thomas R. Hannon
*Assistant Examiner*—Vicky A. Johnson
(74) *Attorney, Agent, or Firm*—Pillsbury Winthrop LLP

(57) ABSTRACT

A tensioner for tensioning engine driven driving elements, such as belts or chains, is disclosed. In accordance with one aspect of the invention, the tensioner is initially installed with the pivot structure spaced past the perpendicular angular position thereof. In accordance with another aspect of the invention, the tension required to move the pivot structure to the end of its range of angular positions is at least 75% more than at the hot engine angular position thereof. In accordance with another aspect of the invention, the tensioner has a stop at the maximum travel position thereof and the tension required to move the pivot structure to its maximum travel position is at least 75% more than at the hot engine angular position thereof. In accordance with a still further aspect of the invention, the tension required to move the pivot structure to a potential tooth skip angular position is greater than the maximum tension the engine is capable of creating.

65 Claims, 6 Drawing Sheets

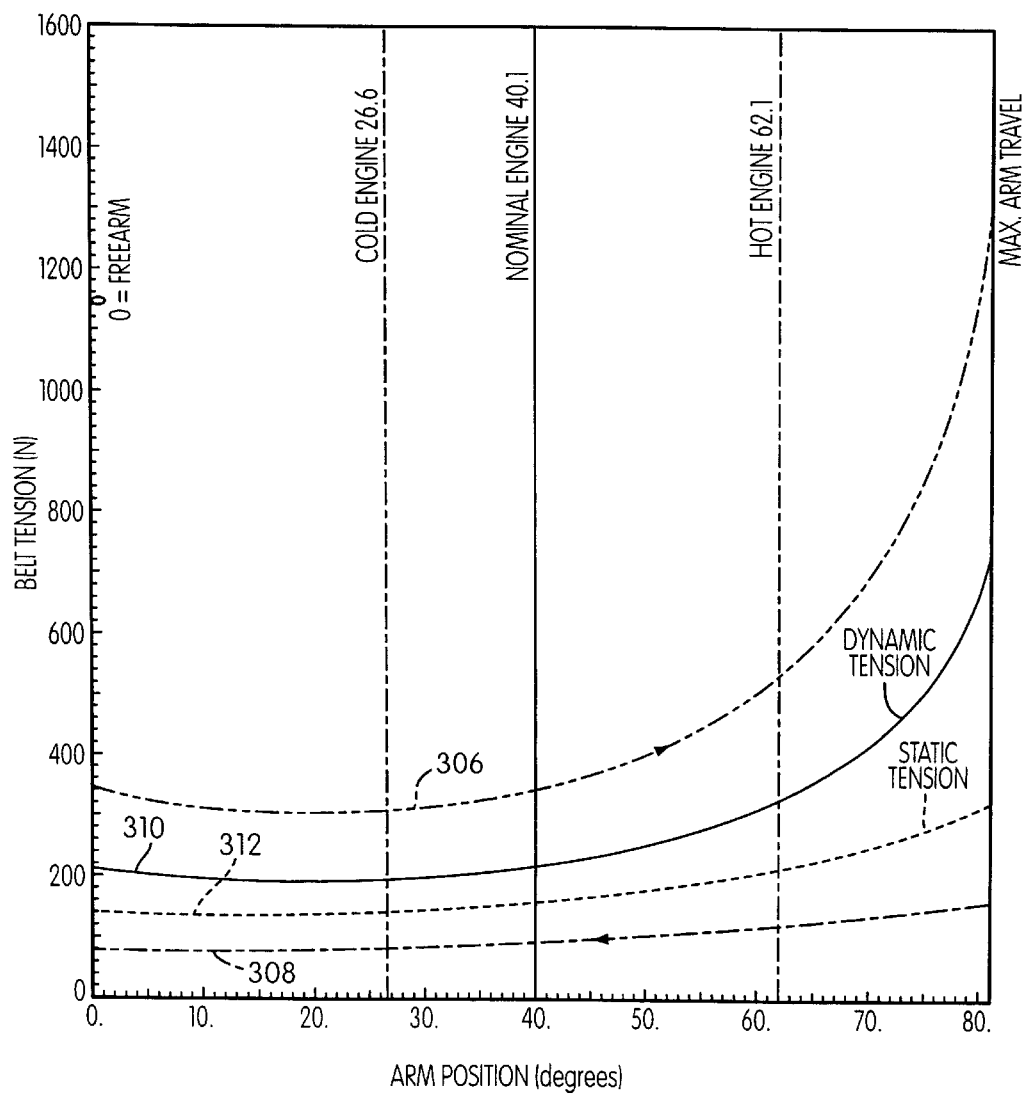

TENSIONER

The present application claims priority to U.S. Provisional Application of Frankowski et al., Ser. No. 60/111,378, filed Dec. 8, 1998, the entirety of which is hereby incorporated into the present application by reference.

FIELD OF THE INVENTION

The present invention relates to tensioners for tensioning engine driven elements such as timing belts or chains. In particular, the present invention is primarily concerned with timing belt tensioners, although the principles of the present invention may also be applied to accessory belt and chain tensioners and timing chain tensioners.

BACKGROUND OF THE INVENTION

In prior art tensioners, the tensioner geometry and characteristics of the tensioner's spring are selected to ensure that the belt tension required to move the tensioner through its range of operating positions remains relatively constant throughout the range. That is, these tensioners are designed so that as belt tension increases due to engine conditions, such as thermal expansion or increased operational belt loads, the tensioner moves under the increased belt tension to compensate for such increases and maintain the belt tension relatively constant.

Prior art tensioners are normally provided with a pair of stops, one at the maximum travel position of the tensioner arm and one at the free arm position of the tensioner arm. These stops restrict the pivotal movement of the tensioner arm and provide the same with a limited range of movement. Because the belt tension required through the range is relatively constant, increases in belt tension can cause the tensioner arm to travel through the range of operating positions until tensioner arm contacts the stop at the maximum travel position thereof. When the increase in belt tension is rapid, the contact between the tensioner arm can create undesirable noises or, in the worst case scenario, damage-the tensioner. This type of increase occurs most commonly as a result of engine kickback at shutdown. If the tensioner is damaged, the engine itself may suffer extensive damage as a result of the timing belt or chain failing to operate the component(s) connected thereto in proper timing with respect to the engine cycles.

Consequently, there exists a need in the art for a tensioner that can be used in combination with vehicle engine that eliminates the problems discussed above with respect to prior art tensioners.

SUMMARY OF THE INVENTION

It is an object of the present invention to meet the above-described need. To achieve this object, one aspect of the present invention provides a combination comprising a vehicle engine, an endless flexible driving element driven by the engine, and a tensioner. The tensioner comprises a fixed structure mounted on the engine, a pivot structure pivotally mounted on the fixed structure for pivotal movement about a pivot axis, spring structure constructed and arranged to apply a tensioning torque to the pivot structure that tends to pivot the pivot structure in a tension applying direction, and a rotatable member rotatably mounted on the pivot structure for rotation about a rotational axis spaced radially from the pivot axis by a radius. The rotatable member engages the driving element in a tension applying relationship such that the driving element is tensioned and in reaction applies a hub load force to the rotatable member at an angle with respect to the radius.

The tensioner is mounted on the engine such that when the engine is in an initial condition the pivot structure is angularly positioned at an initial angular position spaced from a perpendicular angular position at which the hub load force would be applied to the rotatable member perpendicularly to the radius. The initial angular position is spaced from the perpendicular angular position in an opposite direction opposite the tension applying direction. In the initial angular position, the spring structure applies the tensioning torque to the pivot structure such that the driving element is tensioned to a first mean dynamic tension.

As the engine thermally expands to its hot engine condition, the mean dynamic tension in the driving element increases so that the hub load force applied by the driving element pivots the pivot structure in the opposite direction away from the initial angular position thereof to a hot engine angular position. In the hot engine angular position, the spring structure applies the tensioning torque to the pivot structure such that the driving element is tensioned to a second mean dynamic tension greater than the first mean dynamic tension. The tensioner is constructed and arranged such that, as the pivot structure is pivoted from the initial angular position thereof to the hot engine angular position thereof, the angle between the hub load force and the radius continually increases and the spring structure is continually increasingly stressed so that the mean dynamic tension in the driving element continually increases from the first mean dynamic tension to the second mean dynamic tension during the thermal expansion of the engine. The tensioner is also constructed and arranged such that the mean dynamic tension of the driving element required to continue pivoting the pivot structure in the opposite direction from the hot engine position thereof continually increases as a result of the angle between the hub load force and the radius continually increasing and the spring structure being continually increasingly stressed the further the pivot structure is pivoted in the opposite direction from the hot engine position.

The key feature to note of this aspect to the invention is that in the initial angular position of the pivot structure is spaced from the perpendicular angular position in the opposite direction. As a result, as the pivot structure is pivoted from the initial angular position thereof to the hot engine angular position thereof, the angle between the hub load force and the radius continually increases beyond 90 degrees and the spring structure is continually increasingly stressed so that the mean dynamic tension in the driving element continually increases from the first mean dynamic tension to the second mean dynamic tension during the thermal expansion of the engine. Likewise, the mean dynamic tension of the driving element required to continue pivoting the pivot structure in the opposite direction from the hot engine position thereof continually increases as a result of the angle between the hub load force and the radius continually increasing and the spring structure being continually increasingly stressed the further the pivot structure is pivoted in the opposite direction from the hot engine position. In prior art tensioners, the initial angular position of the pivot structure is spaced from the perpendicular angular position in the tension applying direction. Because the torque acting against the spring structure is related to the sine of the angle between the hub load force applied to the rotatable member and the radius, the sine of this angle increases as the pivot structure approaches the perpendicular angular position, thus maximizing the contribution of the tensioner's geometry to that torque. By spacing the initial angular position of the pivot structure in the opposite direction from the perpendicular angular position, the contribution offered to that torque by the tensioner's geometry is reduced, and this reduction increases as a function of the angle between the hub load force and the radius continuing to increase (and hence the sine of that angle decreasing).

In another way to achieve the object of the present invention, another aspect of the present invention provides a vehicle engine, an endless belt driven by the engine, and a tensioner. The engine is capable of applying a maximum tension to the driving element during operation thereof. This maximum tension is the known maximum tension which the engine is capable of creating, and is normally determined from either manufacturer specifications or testing.

The tensioner comprises a fixed structure mounted on the engine, a pivot structure pivotally mounted on the fixed structure for pivotal movement about a pivot axis within a range of angular positions, spring structure constructed and arranged to apply a tensioning torque to the pivot structure that tends to pivot the pivot structure in a tension applying direction within the range of angular positions, and a rotatable member rotatably mounted on the pivot structure for rotation about a rotational axis spaced radially from the pivot axis by a radius. The rotatable member engages the driving element in a tension applying relationship such that the driving element is tensioned and in reaction applies a hub load force to the rotatable member at an angle with respect to the radius. The range of angular positions of the pivot structure includes a potential tooth skip position. This potential tooth skip position is the point at which, if the pivot structure were moved into the potential tooth skip position under driving element tension and then the tension in the driving element were decreased, tooth skip would be allowed to occur between the driving element and the engine if the spring structure failed to move the pivot structure in the tension applying direction to maintain the rotatable member in the tension applying relationship with the driving element. It is important to understand that the tensioner in accordance with this aspect of the invention is designed to prevent the pivot structure from moving into this potential tooth skip position, and that the pivot structure does not necessarily have to move into this position during operation. Instead, this potential tooth skip position is a position at which such tooth skip would occur if the pivot structure were moved to that position and the spring structure failed to move the pivot structure in the tension applying direction. This failure can possibly occur from dirt and other particulate material jamming the pivot structure's movement, or from water on the tensioner freezing during winter conditions and hence jamming the pivot structure's movement.

The tensioner is constructed and arranged such that the mean dynamic tension of the driving element required to pivot the pivot structure in the opposite direction from the hot engine position thereof towards and into the potential tooth skip position is greater than the aforesaid maximum tension the engine is capable of applying to the driving element. Because the mean dynamic tension required to pivot the pivot structure into the potential tooth skip position thereof is greater than the maximum tension that the engine is capable of creating, the tensioner can be considered self-limiting and the need for a maximum travel stop can be obviated. It should be noted, however, that a maximum travel stop may be provided within this aspect of the invention as a safety feature in order accommodate for incorrect installations and the like.

In yet another way to achieve the object of the present invention, yet another aspect of the present invention provides a combination comprising a vehicle engine adapted to thermally expand from an initial condition at an ambient temperature to a hot engine condition due to an increase in engine temperature during engine operation; an endless flexible driving element driven by the engine; and a tensioner. The tensioner comprises a fixed structure mounted on the engine; a pivot structure pivotally mounted on the fixed structure for pivotal movement about a pivot axis; spring structure constructed and arranged to apply a tensioning torque to the pivot structure that tends to pivot the pivot structure in a tension applying direction; a maximum travel stop constructed and arranged to engage the pivot structure pivoting in an opposite direction opposite the tension applying thereof to thereby prevent further pivotal movement of the pivot structure in the opposite direction and provide the pivot structure with a maximum travel angular position; and a rotatable member rotatably mounted on the pivot structure for rotation about a rotational axis spaced radially from the pivot axis by a radius. The rotatable member engages the driving element in a tension applying relationship such that the driving element is tensioned and in reaction applies a hub load force to the rotatable member at an angle with respect to the radius.

The tensioner is mounted on the engine such that when the engine is in the initial condition the pivot structure is angularly positioned at an initial angular position. In the initial angular position, the spring structure applies the tensioning torque to the pivot structure such that the driving element is tensioned to a first mean dynamic tension when the pivot structure is in the initial angular position thereof. As the engine thermally expands to the hot engine condition, the mean dynamic tension in the driving element increases so that the hub load force applied by the driving element pivots the pivot structure in the opposite direction away from the initial angular position thereof to a hot engine angular position. In the hot engine angular position, the spring structure applies the tensioning torque to the pivot structure such that the driving element is tensioned to a second mean dynamic tension when the pivot structure is in the hot engine angular position thereof.

The spring structure and the initial angular position of the pivot structure are selected such that the mean dynamic tension of the driving element required to pivot the pivot structure in the opposite direction from the hot engine position to the maximum travel angular position continually increases in such a manner that the mean dynamic tension required to move the pivot structure from the hot engine position to the maximum travel position is at least 75% greater than the second mean dynamic tension. This feature effectively reduces the contact between the pivot structure and the maximum travel stop, unless the specified driving element tension is created. Further, in the event that the tension is high enough to create contact between the pivot structure and the stop, this increased resistance effectively "cushions" the upstroke of the pivot structure and reduces the force with which such contact is made. In prior art tensioners, there is normally some slight increase in belt tension as the pivot structure moves beyond the hot engine angular position thereof. However, the goal in these prior art tensioners is to maintain a constant belt tension and the increase is not enough to have as significant of an effect as this aspect of the invention, wherein a 75% or greater increase over the second dynamic tension is required. The minimum threshold of 75% is where significant improvement in this type of behavior is typically, seen, and thus is to be regarded as a commercially valuable lower end for this range.

In still another way to achieve the object of the present invention, still another aspect of the present invention provides a combination comprising a vehicle engine adapted to thermally expand from an initial condition at an ambient temperature to a hot engine condition due to an increase in engine temperature during engine operation; an endless flexible driving element driven by the engine; and a tensioner. The tensioner comprises a fixed structure mounted on the engine; a pivot structure pivotally mounted on the fixed structure for pivotal movement about a pivot axis within a predetermined range of angular positions; spring structure constructed and arranged to apply a tensioning torque to the pivot structure that tends to pivot the pivot structure in a tension applying direction within the predetermined range of angular positions; and a rotatable member rotatably mounted on the pivot structure for rotation about a rotational axis spaced radially from the pivot axis by a radius. The rotatable member engages the driving element in a tension applying relationship such that the driving element is tensioned and in reaction applies a hub load force to the rotatable member at an angle with respect to the radius.

The tensioner is mounted on the engine such that when the engine is in the initial condition the pivot structure is angularly positioned at an initial angular position. In this initial angular position, the spring structure applies the tensioning torque to the pivot structure such that the driving element is tensioned to a first mean dynamic tension when the pivot structure is in the initial angular position thereof. As the engine thermally expands! to the hot engine condition, the mean dynamic tension in the driving element increases so that the hub load force applied by the driving element pivots the pivot structure in an opposite direction opposite the tension applying direction away from the initial angular position thereof to a hot engine angular position. The hot engine angular position is spaced from an end of the predetermined range of angular positions in the tension applying direction. The spring structure applies the tensioning torque to the pivot structure such that the driving element is tensioned to a second mean dynamic tension when the pivot structure is in the hot engine angular position thereof. The aforementioned end of the predetermined range may be a point determined by engine manufacturer specifications/requirements, or a maximum travel stop as discussed above. Further, this end of the predetermined range may be the potential tooth skip position in an arrangement wherein no maximum travel stop is used, and the increase in mean dynamic tension necessary to reach this position, which is specified below as being 75% or more greater than the tension at the hot engine angular position, would be set high enough to prevent the pivot structure from moving into this position. This aspect of the invention should not be considered as being limited to a tensioner with a tooth skip position, a stop, or other structures discussed in connection with other aspects of the invention as being determinative of the end of a predetermined range. The spring structure and the initial angular position of the pivot structure are selected such that the mean dynamic tension of the driving element required to pivot the pivot structure in the opposite direction from the hot engine position to the end of the predetermined range continually increases in such a manner that the mean dynamic tension required to pivot structure from the hot engine position to the end of the predetermined range is at least 75% greater than the second mean dynamic tension.

Other objects, features, and advantages of the present application will become appreciated from the following detailed description, the accompanying drawings, and the appended claims.

BRIEF DESCRIPTION OF THE DRAWINGS

FIG. 7 is a graph similar to FIG. 5 for a tensioner constructed in accordance with the principles of the present invention.

DETAILED DESCRIPTION OF THE INVENTION

Figure 1:
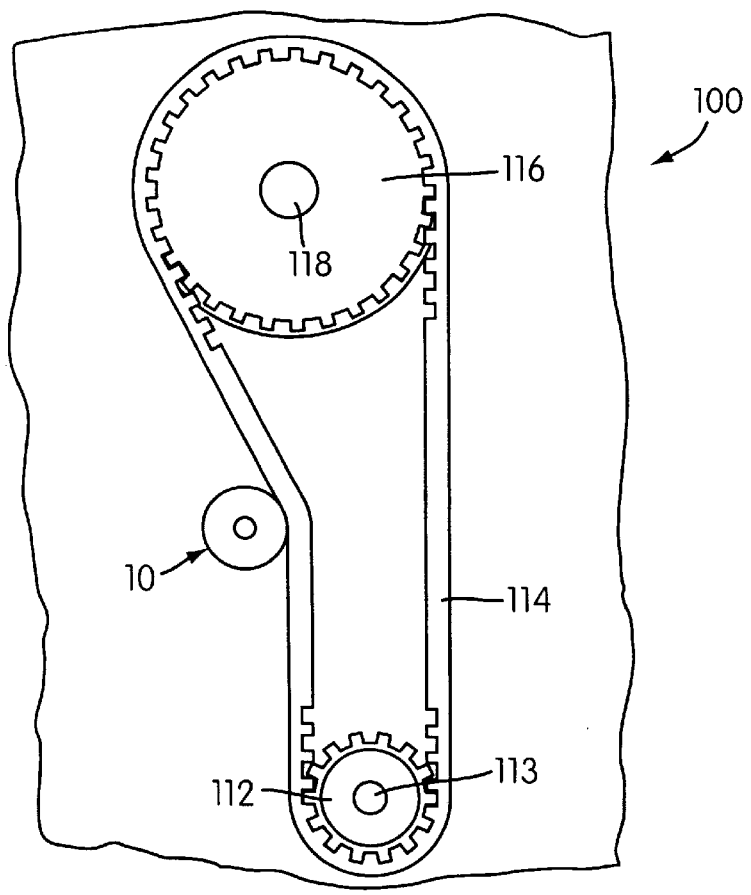
FIG. 1 is a schematic front elevational view of a vehicle's internal combustion engine with a timing belt driven by the engine and a timing belt tensioner constructed in accordance with the principles of the present invention mounted to the engine and engaging the belt in a tension applying relationship.

FIG. 1 shows a schematic front elevational view of a vehicle's internal combustion engine 100 with an endless driving element in the form of an internally toothed timing belt 114 driven by the engine 100 and a timing belt tensioner, generally indicated at 10, constructed in accordance with the principles of the present invention mounted to the engine 100. The tensioner 10 engages the belt 114 in a tension applying relationship. A toothed pulley 112 is fixed to the end of the engine's crankshaft 113 and the toothed side of the belt 114 is trained over the pulley 112 in an intermeshed relationship. The toothed side of the belt 114 is also trained in an intermeshed relationship over a toothed pulley 116 that is fixed to a cam shaft 118 of the engine 100. Rotation of the crankshaft 113 drives the belt 114 via the intermeshed relationship between the belt 114 and the pulley 112, which in turn drives the camshaft 118 via the intermeshed relationship between the belt 114 and the pulley 116. This ensures that the camshaft 118 is driven in time with the engine crankshaft 113, as is conventional in internal combustion engines.

The belts may be trained over the pulley or sprocket of any engine driven component/accessory, and the invention is not necessarily limited to an arrangement wherein the camshaft is being driven. Thus, the belt 114 can be broadly considered to be driving one or more engine driven components.

Figure 2:
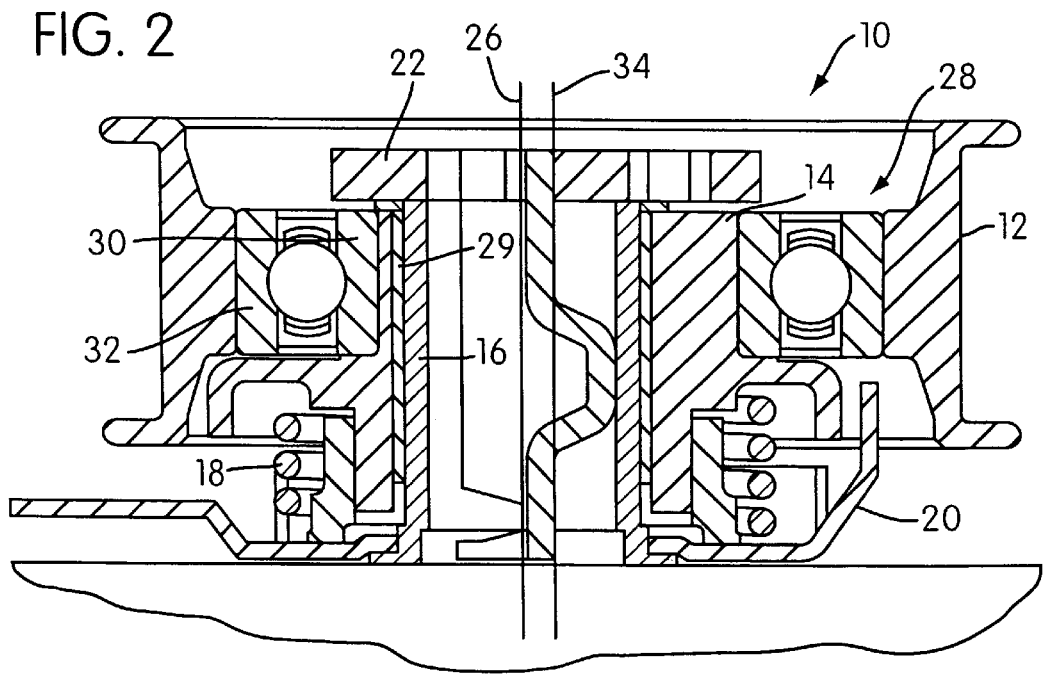
FIG. 2 is a cross-sectional view of the tensioner shown in FIG. 1 taken along a line passing through both the pivotal axis of the tensioner's pivot structure and the rotational axis of the tensioner's rotatable member.

FIG. 2 is a cross-sectional view of the tensioner 10 shown in FIG. 1 taken along a line passing through both the pivotal axis of the tensioner's pivot structure and the rotational axis of the tensioner's rotatable member. The pivot structure is provided by a tensioner arm 14 and the rotatable member is provided by an annular pulley 12. A sprocket (not shown) may be substituted for the pulley 12 in a timing chain system.

The pivot arm 14 is pivotally mounted to a fixed structure in the form of pivot shaft 16 for pivotal movements about a pivot axis 26. Damping structure in the form of annular sleeve 24 is press-fit over the pivot shaft 16 and located between the arm 14 and the pivot shaft 16. As the arm 14 pivots relative to the pivot shaft 16, the sleeve 24 creates friction that resists the pivoting of the arm 14. Friction may also be created between the spring 18 and the spring mounting bracket 20. Suitable damping structures are described in further detail in U.S. Reissue Pat. No. 34,543, the entirety of which is hereby incorporated into the present application by reference, and European Patent Application. No. 0294919, the entirety of which is hereby incorporated into the present application by reference. The pivot shaft 16 is constructed and arranged to mount to the engine 100 using a bolt. An installation structure for facilitating installation and adjustment of the tensioner 10 is indicated at 22.

The pulley 12 is rotatably mounted to the pivot structure by a ball bearing assembly 28. The inner race 30 of assembly 28 is press-fit to the exterior cylindrical surface of the arm 14 and the pulley 12 is press-fit to the exterior surface of the outer race 32 of the assembly 28. The pulley 12 rotates about a rotation axis 34 that is spaced from the pivot axis 26 by a radius r, shown in FIG. 3.

The tensioner 10 also comprises an annular spring mounting bracket 20 fixedly secured to the pivot shaft 16. Spring structure in the form of a wound linear torsion spring 18 is carried within the spring mounting bracket 20. One end of the spring 18 is connected to the arm 14 and the other end of the spring is connected to the bracket 20. The spring 18 applies a tension applying torque to the arm 14 that tends to pivot the arm 14 about the pivot axis 26 thereof in a tension applying direction.

Figure 3:
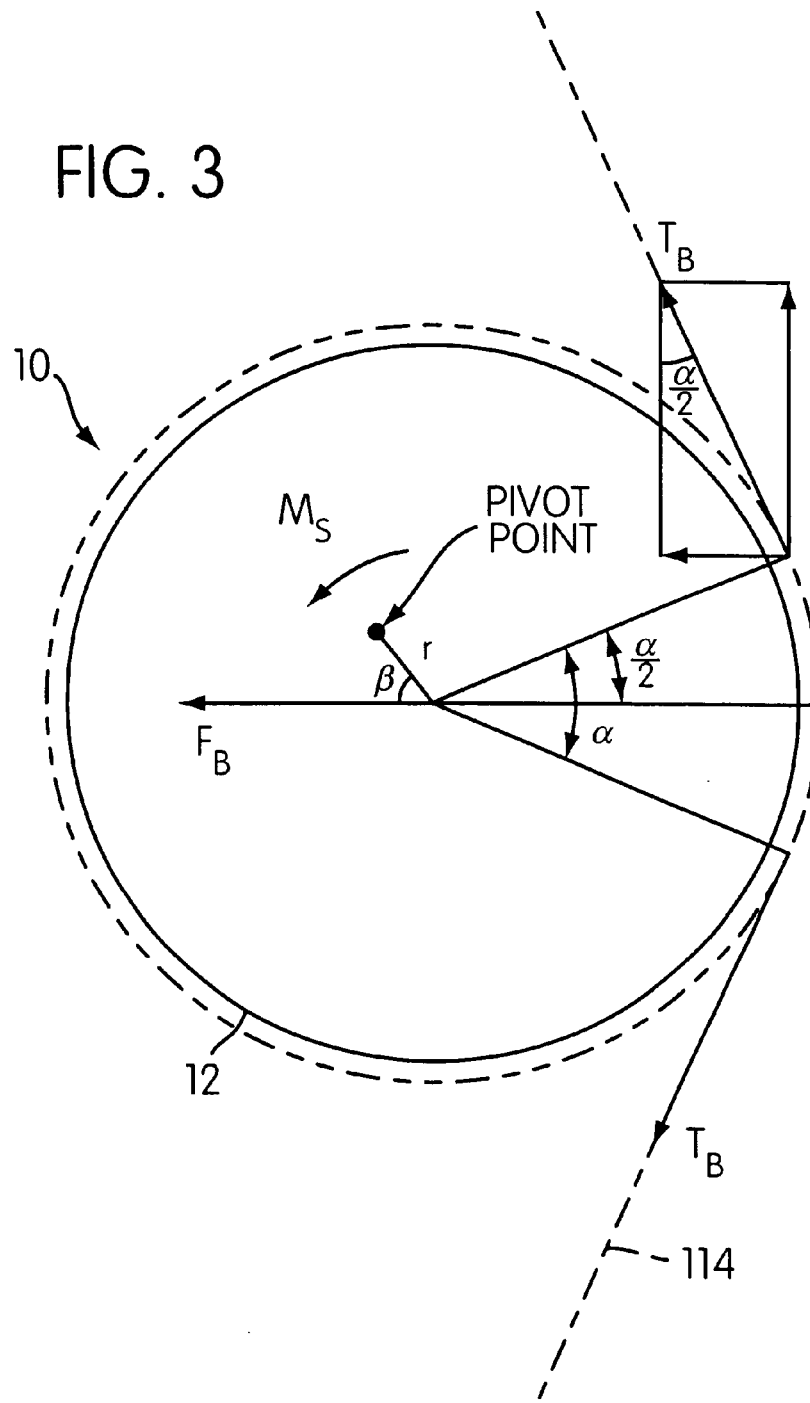
FIG. 3 is a schematic diagram illustrating the forces and torques that are applied to the belt and components of the tensioner during operation.

FIG. 3 shows a schematic diagram illustrating the forces and torques that are applied to the belt and components of the tensioner 10 during operation. In FIG. 3, the belt tension is indicated at $T_b$ and the hub load force applied to pulley 12 in the radial direction thereof by the belt 114 is indicated at $F_b$. The angle at which the hub load force $F_b$ is applied with respect to the radius r extending between the pivot axis 26 and the rotation axis 34 is indicated at β and the wrap angle of the belt 114 with respect to the pulley 12 is indicated at α.

The torque $M_b$ applied to the tensioner arm 14 is related to the hub load force $F_b$ as follows: $M_b=(F_b)(r)(SIN\beta)$. The hub load force $F_b$ is related to the belt tension $T_b$ by the following relationship: $F_b=2(T_b)(SIN(\alpha/2))$. By combining these two equations using substitution, the torque $M_b$ applied to the tensioner arm 14 can be expressed in relation to the belt tension $T_b$ as follows: $M_b=2(T_b)(r)(SIN(\alpha/2))(SIN\beta)$.

Using these equations, it is possible to determine a theoretical amount of tensioning torque (which is indicated as $M_s$ in FIG. 3) that the spring 18 must apply to the tensioner arm 14 over a range of angular positions in order to maintain the belt tension at a constant level. That is, it is possible to determine the amount of resistance to movement that theoretically must be offered by the spring 18 over the pivot arm's range of angular positions in order to allow tensioner arm 14 to move in a suitable manner to compensate for increases/decreases in belt tension whereby the arm moves a sufficient amount to reestablish the belt tension at its proper amount. Keep in mind that this is a "theoretical" amount and, as will become better appreciated hereinbelow, there is no commercially available spring that is capable of behaving commensurate with these theoretical requirements. Further, the belt driven system is a dynamic system and thus the damping structure will play a role in the overall resistance to pivot structure movement that is offered by the tensioner 10 as a whole.

Figure 4:
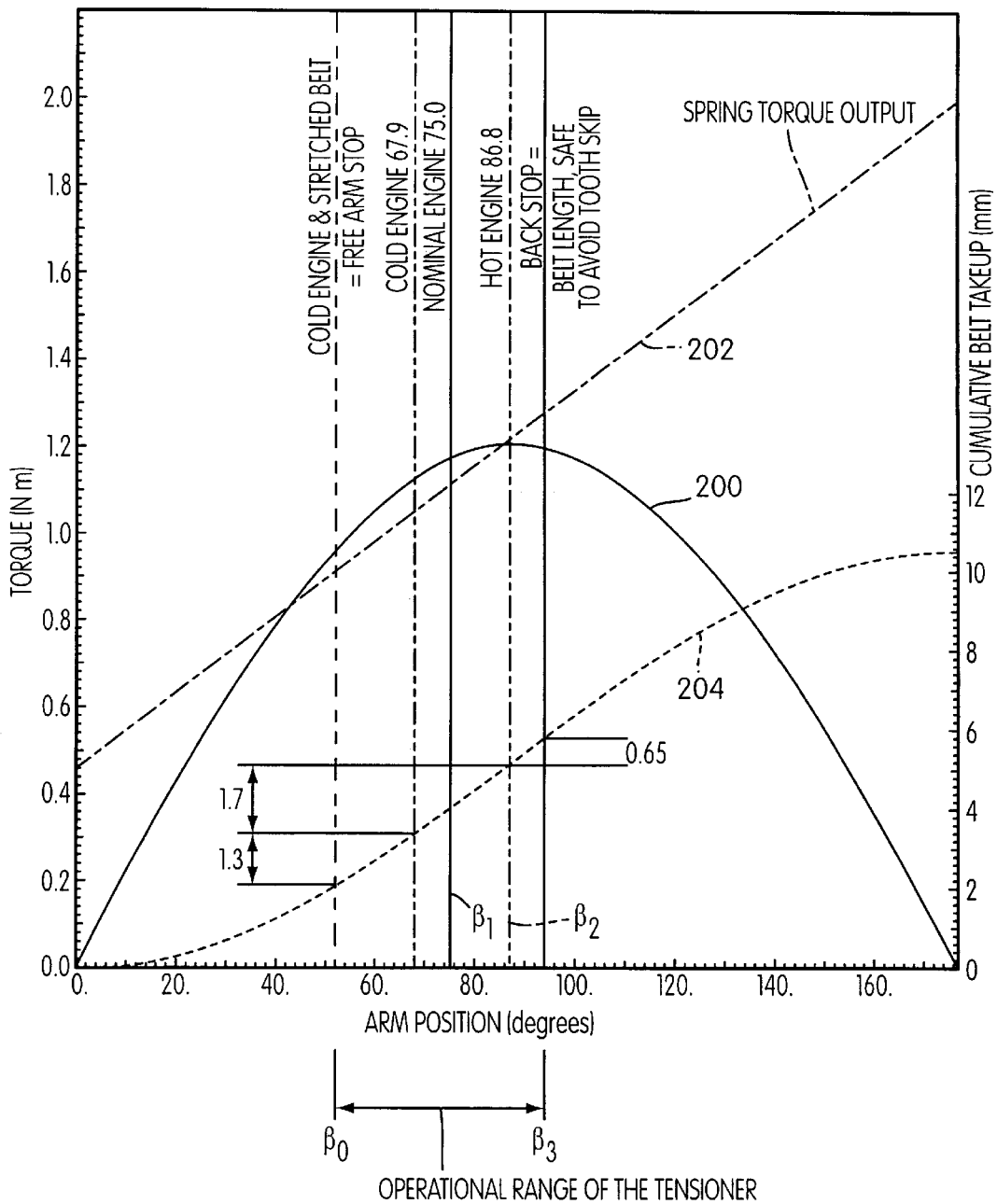
FIG. 4 is a graph depicting a curve representing a theoretical torque requirement for the spring structure that would provide for constant belt tension and a straight line illustrating the actual torque output of a spring structure selected based on the theoretical requirement for use in a prior art tensioner.

FIG. 4 shows a graph depicting the theoretical requirement for $M_s$ over a 180 degree range of pivot arm movement in a prior art tensioner. The vertical axis of this graph is torque in Newton-meters and the horizontal axis of this graph is the angle in degrees between the hub load force $F_b$ and the radius r of the pivot arm 14. The line indicated at 200 in FIG. 4 is $M_s$. Note that this curve has a sinusoidal profile, which is a result of being related to the equation $2(T_b)(r)(SIN(\alpha2))(SIN\beta)$. Also, note that the torque requirement in theory is at a maximum where the angle between the hub load force and the radius is 90 degrees, which is defined for the purposes of this application as the perpendicular angular position of the pivot arm 14. Likewise, the torque requirement of the spring $M_s$ is approaches zero towards the 0 and 180 degree positions of the pivot arm 14.

The predetermined range of operative positions for this prior art tensioner is defined between positions β0 and β3, which correspond to the free arm and maximum travel positions of the pivot arm 14, respectively. In this prior art tensioner, a stop is positioned at each of these positions to ensure that the pivot arm does not travel beyond then. Position β1 represents an initial angular position, which is commonly referred to in the art as the nominal position. This position β3 is the position at which the arm is angularly positioned when the tensioner is initially installed on the engine 100 while the engine is in its initial condition and engaged with a new belt 114, assuming installation is performed correctly as per the tensioner design and engine specifications. The initial condition of the engine is the condition of the engine when it is at ambient room temperature. It should be noted that this initial angular position is spaced in the tension applying direction (to the left) away from the aforementioned perpendicular angular position in this prior art arrangement.

Position β2 represents a hot engine angular position of the tensioner arm 14. This position β2 is the position at which the arm 14 is angularly positioned when the engine is in its hot engine condition. The hot engine condition is the condition of the engine when its temperature increases to its operating temperature. As a result of this temperature increase, the engine thermally expands and the components with which the belt 114 is engaged are moved relatively apart from one another. This movement causes the tension of the belt to increase.

Continuing to refer to FIG. 4, the line at 202 therein represents the actual behavior of the torsion spring 18 used in this prior art tensioner. The slope of line 202 is the spring rate of the spring 18. As is customary with prior art tensioner design, the actual spring torque line 202 and the range between β0 and β3 have been selected so that the actual spring torque line matches up somewhat closely to the theoretical torque line 200 over a narrow portion thereof within the predetermined range of angular positions. The spring behavior can be altered by selecting the spring rate and pretensioning with which the spring is installed. The range of positions provided by β0 and β3 can be altered by varying the mounting location of the tensioner, the pulley diameter, the pivot arm radius, the locations of the stops. This is the manner in which conventional tensioner design methods have attempted to achieve a relatively constant belt tension over the operative range. Line 204 in FIG. 4 shows the cumulative belt take-up for the arrangement of the tensioner designed in accordance with FIG. 4.

Figure 5:
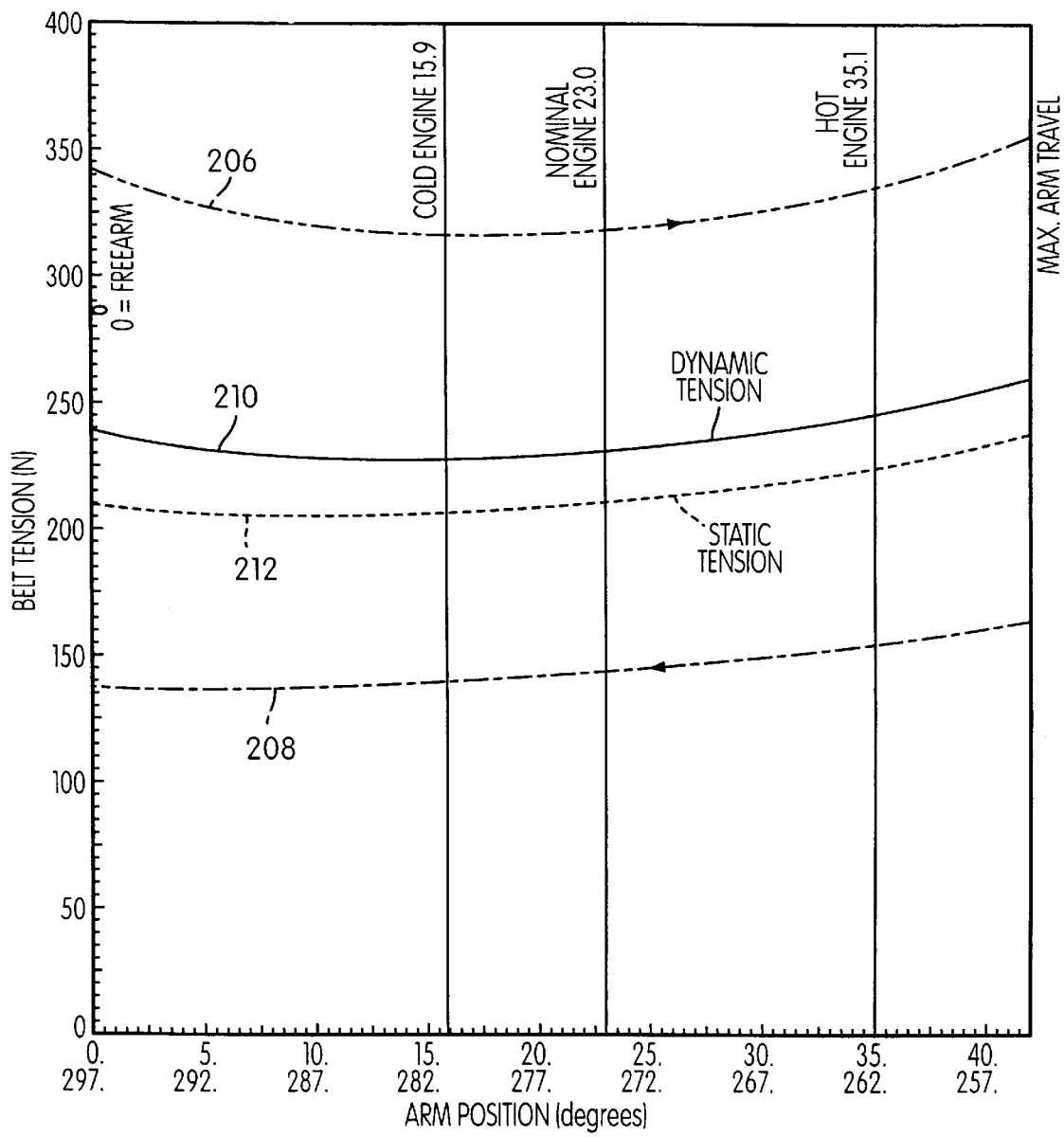
FIG. 5 is a graph illustrating actual belt tension achieved using the spring structure in FIG. 4.

FIG. 5 shows a graph depicting the performance of the tensioner designed in accordance with FIG. 4 in terms of the belt tension achieved. The vertical axis shows the amount of belt tension that is created in the belt when using the belt tensioner of FIG. 4 and the horizontal axis is the angular position of the tensioner arm 14 radius with respect to the hub load force. Line 206 represents the tension that the tensioner should apply to the belt 114 on the upstroke of the tensioner (movement of the tensioner arm in the direction opposite the tension applying direction) and line 208 represents the tension that the tensioner should apply to the belt 114 on the downstroke of the tensioner (movement of the tensioner arm in the tension applying direction). The reason for the disparity between belt tension in the upstroke and downstroke is attributable to the damping structure. Specifically, on the upstroke, the damping structure frictionally resists movement of the tensioner arm 14 in the aforementioned direction opposite the tension applying direction and hence the spring 18 and damping structure work together to resist pivot arm movement. On the downstroke, the damping structure frictionally resists movement of the tensioner arm 14 in the tension applying direction and hence the damping structure is working against the action of the spring 18. Line 210 represents the mean dynamic tension of the belt, which is the average of lines 206 and 208. This mean dynamic tension is more representative of what actually happens during engine operation because the belt tension is dynamic and rapidly changing. As a result, the tensioner acts in a dynamic manner and the arm 14 thereof oscillates rapidly back and forth between up and downstrokes. Further, when evaluating tensioner performance during engine operation, upstroke and downstroke belt tension cannot readily be measured with any accuracy and normally such testing is done by measuring the mean dynamic belt tension. As such, the claims of this application present each of the aspects of the invention in terms of dynamic belt tension rather than tension during either of the up and downstrokes, although the scope of the invention could be expressed in terms of the other tensions mentioned herein.

Line 212 in FIG. 5 represents the static belt tension. This static belt tension is unaffected by the damping structure because the pivot arm does not move while the system is static. This line is useful for understanding how the spring and tensioner geometry relate to one another without taking into account the complexities involved with understanding the dynamic system behavior and the damping structure's effect thereon.

It should be noted that the mean dynamic belt tension as shown in FIG. 5 increases from about 245N to about 260N from β2 (hot engine) to β3 (maximum travel), an increase of approximately 6.1%.

In accordance with the present invention, the parameters concerning the tensioner geometry and spring and damping characteristics are selected so that the mean dynamic belt tension increases rapidly as the pivot arm 14 moves opposite the tension applying direction past the hot engine angular position β2 and towards position β3. In accordance with the broad aspects of the invention, position β3 is not necessarily a maximum travel position which is determined by the presence of travel stop. Instead, position β3 may be the end position of a predetermined range of angular positions which has been specified by engine manufacturer requirements. Likewise, position β3 may be a potential tooth skip position at which, if the pivot structure were moved into the potential tooth skip position under driving element tension and then the tension in the driving element were decreased, tooth skip would be allowed to occur between the driving element and the engine if the spring structure failed to move the pivot structure in the tension applying direction to maintain the rotatable member in the tension applying relationship with the driving element. This failure can possibly occur from dirt and other particulate material jamming the pivot arm's movement, or from water on the tensioner freezing during winter conditions and hence jamming the pivot structure's movement. Of course, position β3 may be determined by the presence of a stop which it is desired to avoid contacting, or at least cushion the pivot arm movement prior to contacting the stop.

In the arrangement wherein position β3 corresponds to the potential tooth skip position and the tensioner is constructed and arranged such that the tension required to move the arm 14 into the tooth skip position β3 is greater than the amount of belt tension that the engine is capable of creating, the use of a stop at position β3 may be omitted. However, a stop may be placed at that position as a redundant safety feature and as a safeguard against incorrect installations.

Figure 6:
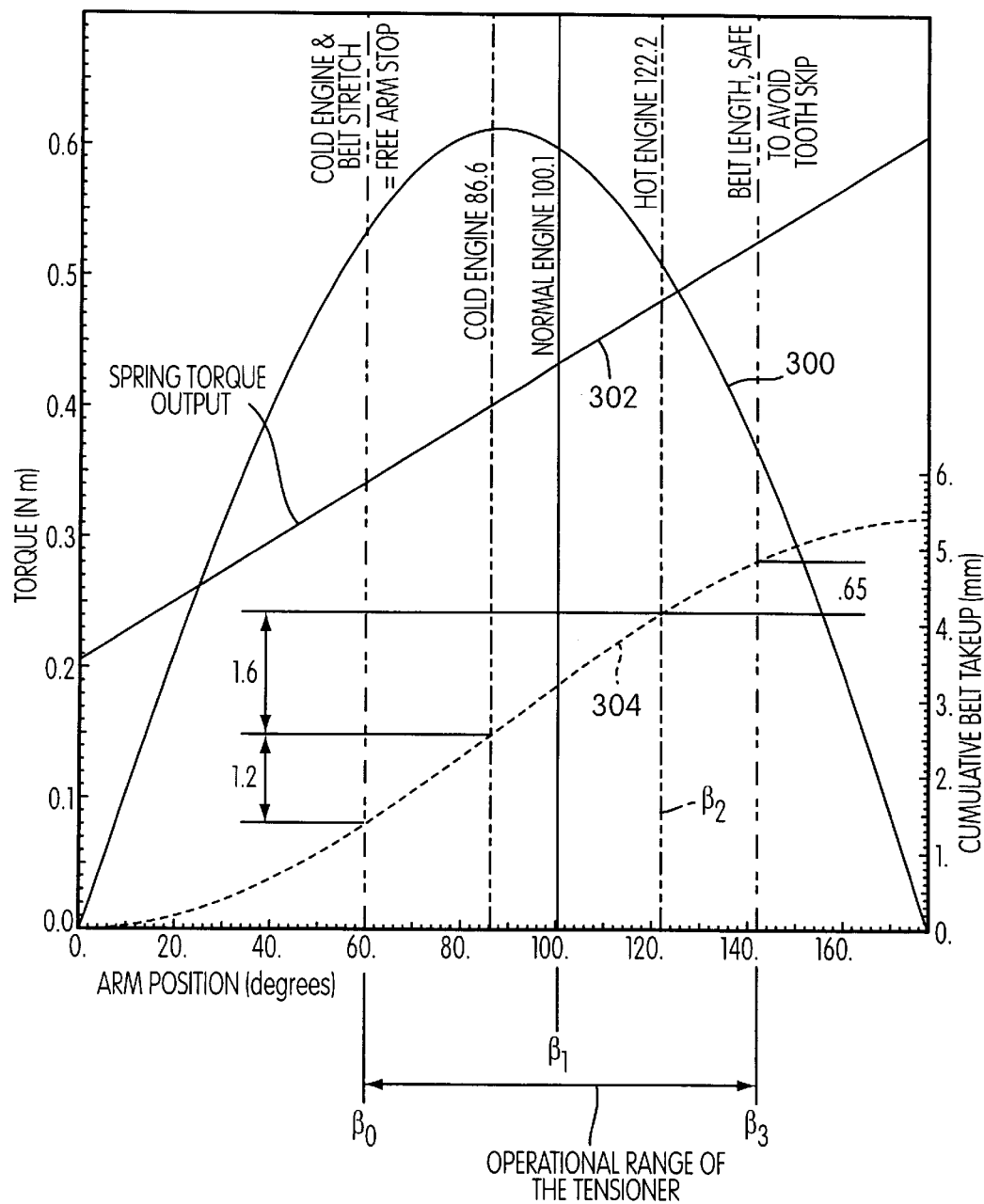
FIG. 6 is a graph similar to FIG. 4 for a tensioner constructed in accordance with the principles of the present invention.

FIGS. 6 and 7 show graphs similar to FIGS. 4 and 5, respectively, for a tensioner 10 constructed in accordance with the principles of the present invention. Line 300 in FIG. 6 represents the aforementioned theoretical value for spring torque $M_s$, line 302 represents the actual spring torque $M_s$, and line 304 represents the cumulative belt take-up. Line 306 in FIG. 7 represents the upstroke belt tension, line 308 represents the downstroke belt tension, line 310 represents the mean dynamic tension, and line 312 represents the static belt tension.

As can be appreciated from viewing FIGS. 6 and 7, the spring rate and tensioner geometry have been selected such that the mean dynamic belt tension required to move the pivot arm 14 in the direction opposite the tension applying direction continually increases between the initial angular position β1 and the hot engine position β2. In accordance with one aspect of the invention, this is accomplished by selecting an initial angular position that is spaced in the direction opposite the tension applying direction (i.e. to the right in FIG. 6) from the initial angular position β1. As a result, as the pivot arm 14 is pivoted from the initial angular position β1 thereof to the hot engine angular position thereof, the angle between the hub load force and the radius continually increases beyond 90 degrees and the spring structure is continually increasingly stressed so that the mean dynamic tension in the driving element continually increases from the first mean dynamic tension to the second mean dynamic tension during the thermal expansion of the engine. In prior art tensioners, because the torque acting against the spring structure is related to the sine of the angle between the hub load force applied to the rotatable member and the radius, the sine of this angle increases as the pivot structure approaches the perpendicular angular position, thus maximizing the contribution of the tensioner's geometry to that torque. By spacing the initial angular position of the pivot structure in the opposite direction from the perpendicular angular position, the contribution offered to that torque by the tensioner's geometry is reduced, and this reduction increases as a function of the angle between the hub load force and the radius continuing to increase (and hence the sine of that angle decreasing). Further, positioning the initial angular position to the right of the perpendicular angular position ensures that the hot engine will be moved further in the opposite direction, whereat the angle between the radius and the hub load force becomes increasingly smaller and hence the sine of that angle decreases incrementally at a faster rate.

Preferably, the initial angular position is spaced at least 5 or 10 degrees from the perpendicular angular position in the direction opposite the tension applying direction.

As can be seen from reviewing FIG. 7, the mean dynamic belt tension required to move the pivot arm 14 to the hot engine position β2 is about 300N and the mean dynamic belt tension required to move the pivot arm 14 to position β3 is about 710N. This is approximately a 130% increase. Preferably, in accordance with one aspect of the invention, the minimum amount of increase between these two is at least 75%, although in other aspects of the invention this amount may be lower. Specifically, in accordance with some aspects of the invention the threshold may be as low as 30 or 50%, although it is preferred that they be 100% or greater. In other aspects of the invention, the specific amount of increase in terms of percentage is unimportant. For example, in the aspect of the invention wherein β3 represents the potential tooth skip position, the tensioner 10 is constructed and arranged by way of selecting appropriate tensioner geometry and spring characteristic to ensure that the belt tension required to move the tensioner arm 14 into the potential tooth skip position is greater than the maximum belt tension of which the engine is capable of creating irrespective of a predefined minimum belt tension increase.

In addition, in vehicles the engine thereof is constructed and arranged such that the crankshaft can be turned in a reverse rotating direction opposite its normal forward rotating direction. This typically can occur when a vehicle is left in gear and parked on a hill. Backwards rolling of the vehicle backdrives the engine in this reverse rotating manner. During this backdriving, the engine is capable of applying a reverse operation maximum tension to said driving element. In the normal arrangement of most vehicle engines, the tensioner 10 is located downstream of the operative components in the normal running direction of the belt (i.e. the belt runs clockwise in FIG. 1). As a result, a significant portion of the belt load is transferred to the one or more operative components located between the crankshaft and the tensioner 10. However, when the engine is backdriven as mentioned above, the tensioner is the first element downstream of the belts reverse running direction and thus there are no intervening components to absorb this belt load. As a result, tensioner must be designed to take this type of loading into account in addition to the types of belts load seen during normal (i.e. forward crankshaft rotation) engine operation. Thus, in accordance with a further aspect of the invention, the tensioner 10 is constructed and arranged, specifically by carefully choosing spring characteristics and tensioner geometry, such that the tension required to move the arm 14 into the potential tooth skip position thereof is greater than the maximum reverse operation tension that the engine is capable of creating. This prevents tooth skip from occuring during these backdrive conditions. The exact amount of this maximum reverse operation tension can ascertain either through testing or from engine manufacturer specifications.

It will thus be seen that the objective of the present invention have been fully and effectively accomplished. The foregoing specific embodiments have been provided to illustrate the structural and functional principles of the present invention and are not intended to be limiting. To the contrary, the present invention is intended to encompass all modifications, alterations, substitutions, and changes within the spirit and scope of the following appended claims.

What is claimed is:

1. A combination comprising:
   a vehicle engine adapted to thermally expand from an initial condition at an ambient temperature to a hot engine condition due to an increase in engine temperature during engine operation;
   an endless flexible driving element driven by said engine;
   a tensioner comprising:
   a fixed structure mounted on said engine;
   a pivot structure pivotally mounted on said fixed structure for pivotal movement about a pivot axis;
   spring structure constructed and arranged to apply a tensioning torque to said pivot structure that tends to pivot said pivot structure in a tension applying direction;
   a rotatable member rotatably mounted on said pivot structure for rotation about a rotational axis spaced radially from said pivot axis by a radius, said rotatable member engaging said driving element in a tension applying relationship such that said driving element is tensioned and in reaction applies a hub load force to said rotatable member at an angle with respect to said radius;
   said tensioner being mounted on said engine such that when said engine is in said initial condition said pivot structure is angularly positioned at an initial angular position spaced from a perpendicular angular position at which said hub load force would be applied to said rotatable member perpendicular to said radius, said initial angular position being spaced from said perpendiculer angular position in a return direction opposite said tension applying direction, said spring structure applying said tensioning torque to said pivot structure such that said driving element is tensioned to a first mean dynamic tension when said pivot structure is in said initial angular position thereof;
   said engine and said driving element being constructed and arranged such that as said engine thermally expands to said hot engine condition the mean dynamic tension in said driving element increases so that the hub load force applied by said driving element pivots said pivot structure in said return direction away from said initial angular position thereof to a hot engine angular position, said spring structure applying said tensioning torque to said pivot structure such that said driving element is tensioned to a second mean dynamic tension greater than said first mean dynamic tension when said pivot structure is in said hot engine angular position thereof;
   said tensioner being constructed and arranged such that, as said pivot structure is pivoted from said initial angular position thereof to said hot engine angular position thereof, the angle between said hub load force and said radius continually increases and said spring structure is continually increasingly stressed so that the mean dynamic tension in said driving element continually increases from said first mean dynamic tension to said second mean dynamic tension during the thermal expansion of said engine;
   said tensioner being constructed and arranged such that the mean dynamic tension of said driving element required to continue pivoting said pivot structure in said return direction from said hot engine position thereof continually increases as a result of the angle between said hub load force and said radius continually increasing and said spring structure being continually increasingly stressed the further said pivot structure is pivoted in said return direction from said hot engine position.

2. A combination according to claim 1, wherein said initial angular position is spaced at least 5 degrees from said perpendicular angular position in said return direction.

3. A combination according to claim 2, wherein said initial angular position is spaced at least 10 degrees from said perpendicular angular position in said return direction.

4. A combination according to claim 1, wherein said tensioner further comprises a stop constructed and arranged to engage said pivot structure and wherein said pivot structure is capable of pivoting in said return direction from said hot engine angular position to a maximum travel angular position wherein said pivot structure contacts said stop to prevent further pivotal movement of said pivot structure in said return direction;

said tensioner being constructed and arranged such that the mean dynamic tension of said driving element required to pivot said pivot structure in said return direction from said hot engine position thereof to said maximum travel position is 30 percent greater than said second mean dynamic tension as a result of the angle between said hub load force and said radius continually increasing and said spring structure being continually increasingly stressed the further said pivot structure is pivoted in said return direction from said hot engine position.

5. A combination according to claim 4, wherein said tensioner is constructed and arranged such that the mean dynamic tension of said driving element required to pivot said pivot structure in said return direction from said hot engine position thereof to said maximum travel position is 50 percent greater than said second mean dynamic tension as a result of the angle between said hub load force and said radius continually increasing and said spring structure being continually increasingly stressed the further said pivot structure is pivoted in said return direction from said hot engine position.

6. A combination according to claim 5, wherein said tensioner is constructed and arranged such that the mean dynamic tension of said driving element required to pivot said pivot structure in said return direction from said hot engine position thereof to said maximum (ravel position is 100 percent greater than said second mean dynamic tension as a result of the angle between said hub load force and said radius continually increasing and said spring structure being continually increasingly stressed the further said pivot structure is pivoted in said return direction from said hot engine position.

7. A combination according to claim 1, further comprising damping structure constructed and arranged to resist pivotal movement of said pivot structure about said pivot axis in both said tension applying and said return directions thereof.

8. A combination according to claim 7, wherein said damping structure fictionally resists pivotal movement of said pivot structure about said pivot axis in both said tension applying and return directions thereof.

9. A combination according to claim 1, wherein said spring structure comprises a torsion spring.

10. A combination according to claim 1, wherein said endless driving element is an endless flexible belt and wherein said rotatable member is a pulley member engaging said belt in said tension applying relationship.

11. A combination according to claim 10, wherein said belt is a timing belt.

12. A combination according to claim 1, wherein said endless as driving element is an endless flexible chain and wherein said rotatable member is a sprocket member intermeshingly engaging said chain in said tension applying relationship.

13. A combination according to claim 12, wherein said chain is a timing chain.

14. A combination comprising:
a vehicle engine adapted to thermally expand from an initial condition at an ambient temperature to a hot engine condition due to an increase in engine temperature during engine operation;
an endless flexible driving element driven by said engine;
a tensioner comprising:
a fixed structure mounted on said engine;
a pivot structure pivotally mounted on said fixed structure for pivotal movement about a pivot axis within a predetermined range of angular positions;
spring structure constructed and arranged to apply a tensioning torque to said pivot structure that tends to pivot said pivot structure in a tension applying direction within said predetermined range of angular positions;
a rotatable member rotatably mounted on said pivot structure for rotation about a rotational axis spaced radially from said pivot axis by a radius, said rotatable member engaging said driving element in a tension applying relationship such that said driving element is tensioned and in reaction applies a hub load force to said rotatable member at an angle with respect to said radios;
said tensioner being mounted on said engine such that when said engine is in said initial condition said pivot structure is angularly positioned at an initial angular position, said spring structure applying said tensioning torque to said pivot structure such that said driving element is tensioned to a first mean dynamic tension when said pivot structure is in said initial angular position thereof;
said engine and said driving element being constructed and arranged such that as said engine thermally expands to said hot engine condition the mean dynamic tension in said driving element increases so that the hub load force applied by said driving element pivots said pivot structure in a return direction opposite said tension applying direction away from said initial angular position thereof to a hot engine angular position, said hot engine angular position being spaced from an end of said predetermined range of angular positions in said tension applying direction, said spring structure applying said tensioning torque to said pivot structure such that said driving element is tensioned to a second mean dynamic tension when said pivot structure is in said hot engine angular position thereof;
said spring structure and said initial angular position of said pivot structure being selected such that the mean dynamic tension of said driving element required to pivot said pivot structure in said return direction from said hot engine position to said end of said predetermined range continually increases in such a manner that the mean dynamic tension required to move said pivot structure from said hot engine position to said end of said predetermined range is at least 75% greater than said second mean dynamic tension.

15. A combination according to claim 14, wherein said initial angular position of said pivot structure is selected with respect to a perpendicular angular position at which said hub load force would be applied to said rotatable member perpendicularly to said radius such that said hot engine angular position of said pivot structure is spaced in said return direction from said perpendicular angular position so that the mean dynamic tension of said driving element required to continue pivoting said pivot structure in said return direction from said hot engine position thereof continually increases as a result of the angle between said hub load force and said radius continually increasing and said spring structure being continually increasingly stressed the further said pivot structure is pivoted in said return direction from said hot engine position.

16. A combination according to claim 15, wherein said initial angular position is spaced in said return direction from said perpendicular angular position such that, as said pivot structure is pivoted from said initial angular position thereof to said hot engine angular position thereof, the angle between said hub load force and said radius continually increases and said spring structure is continually increasingly stressed so that the mean dynamic tension in said driving element continually increases from said first mean dynamic tension to said second mean dynamic tension during the thermal expansion of said engine.

17. A combination according to claim 16, wherein said initial angular position is spaced at east 5 degrees from said perpendicular angular position in said return direction.

18. A combination according to claim 17, wherein said initial angular position is spaced at least 10 degrees from said perpendicular angular position in said return direction.

19. A combination according to claim 14, further comprising damping structure constructed and arranged to resist pivotal movement of said pivot structure about said pivot axis in both said tension applying and said return directions thereof.

20. A combination according to claim 19, wherein said damping structure frictionally resists pivotal movement of said pivot structure about said pivot axis in both said tension applying and return directions thereof.

21. A combination according to claim 14, wherein said spring structure comprises a torsion spring.

22. A combination according to claim 14, wherein said endless driving element is an endless flexible belt and wherein said rotatable member is a pulley member engaging said belt in said tension applying relationship.

23. A combination according to claim 22, wherein said belt is a timing belt.

24. A combination according to claim 14, wherein said endless driving element is an endless flexible chain and wherein said rotatable member is a sprocket member intermeshingly engaging said chain in said tension applying relationship.

25. A combination according to claim 24, wherein said chain is a timing chain.

26. A combination according to claim 14, wherein said tensioner comprises a stop, said stop being positioned with respect to said pivot structure such that said pivot structure engages said stop at said end of said predetermined range thereof.

27. A combination according to claim 14, wherein said tensioner is devoid of a stop that restricts pivotal movement of said pivot structure in said return direction.

28. A combination comprising;
a vehicle engine adapted to thermally expand from an initial condition at an ambient temperature to a hot engine condition due to an increase in engine temperature during engine operation;
an endless flexible driving element driven by said engine;
a tensioner comprising:
a fixed structure mounted on said engine;
a pivot structure pivotally mounted on said fixed structure for pivotal movement about a pivot axis;
spring structure constructed and arranged to apply a tensioning torque to said pivot structure that tends to pivot said pivot structure in a tension applying direction;
a maximum travel stop constructed and arranged to engage said pivot structure pivoting in a return direction opposite said tension applying thereof to thereby prevent further pivotal movement of said pivot structure in said return direction and provide said pivot structure with a maximum travel angular position,
a rotatable member rotatably mounted on said pivot structure for rotation about a rotational axis spaced radially from said pivot axis by a radius, said rotatable member engaging said driving element in a tension applying relationship such that said driving element is tensioned and in reaction applies a hub load force to said rotatable member at an angle with respect to said radius;
said tensioner being mounted on said engine such that when said engine is in said initial condition said pivot structure is angularly positioned at an initial angular position, said spring structure applying said tensioning torque to said pivot structure such that said driving element is tensioned to a first mean dynamic tension when said pivot structure is in said initial angular position thereof;
said engine and said driving element being constructed and arranged such that as said engine thermally expands to said hot engine condition the mean dynamic tension in said driving element increases so that the hub load force applied by said driving element pivots said pivot structure in said return direction away from said initial angular position thereof to a hot engine angular position, said spring structure applying said tensioning torque to said pivot structure such that said diving element is tensioned to a second mean dynamic tension when said pivot structure is in said hot engine angular position thereof;
said spring structure and said initial angular position of said pivot structure being selected such that the mean dynamic tension of said driving element required to pivot said pivot structure in said return direction from said hot engine position to said maximum travel angular position continually increases in such a manner that the mean dynamic tension required to move said pivot structure from said hot engine position to said maximum travel position is at least 75% greater than said second mean dynamic tension.

29. A combination according to claim 28, wherein said initial angular position of said pivot structure is selected with respect to a perpendicular angular position at which said hub load force would be applied to said rotatable member perpendicular to said radius such that said hot engine angular position of said pivot structure is spaced in said return direction from said perpendicular anglar position so that the mean dynamic tension of said driving element required to continue pivoting said pivot structure in said return direction from said hot engine position thereof continually increases as a result of the angle between said hub load force and said radius continually increasing and said spring structure being continually increasingly stressed the further said pivot structure is pivoted in said return direction from said hot engine position.

30. A combination according to claim 29, wherein said initial angular position is spaced in said return direction from said perpendicular angular position such that, as said pivot structure is pivoted from said initial angular position thereof to said hot engine angular position thereof, the angle between said hub load force and said radius continually increases and said spring structure is continually increasingly stressed so that the mean dynamic tension in said driving element continually increases from said first mean dynamic tension to said second mean dynamic tension during the thermal expansion of said engine.

31. A combination according to claim 30, wherein said initial angular position is spaced at least 5 degrees from said perpendicular angular position in said return direction.

32. A combination according to claim 32, wherein said initial angular position is spaced at least 10 degrees from said perpendicular angular position in said return direction.

33. A combination according to claim 28, further comprising damping structure constructed and arranged to resist pivotal movement of said pivot structure about said pivot axis in both said tension applying and said return directions thereof.

34. A combination according to claim 33, wherein said damping structure frictionally resists pivotal movement of said pivot structure about said pivot axis in both said tension applying and return directions thereof.

35. A combination according to claim 28, wherein said spring structure comprises a torsion spring.

36. A combination according to claim 28, wherein said endless driving element is an endless flexible belt and wherein said rotatable member is a pulley member engaging said belt in said tension applying relationship.

37. A combination according to claim 36, wherein said belt is a timing belt.

38. A combination according to claim 28, wherein said endless driving element is an endless flexible chain and wherein said rotatable member is a sprocket member intermeshingly engaging said chain in said tension applying relationship.

39. A combination according to claim 38, wherein said chain is a timing chain.

40. A combination comprising:
a vehicle engine;
an endless flexible driving element driven by said engine, said engine being capable of applying a maximum tension to said driving element during operation thereof;
a tensioner comprising:
a fixed structure mounted on said engine;
a pivot structure pivotally mounted on said fixed structure for pivotal movement about a pivot axis within a range of angular positions;
spring structure constructed and arranged to apply a tensioning torque to said pivot structure that tends to pivot said pivot structure in a tension applying direction within said range of angular positions;
a rotatable member rotatably mounted on said pivot structure for rotation about a rotational axis spaced radially from said pivot axis by a radius, said rotatable member engaging said driving element in a tension applying relationship such that said driving element is tensioned and in reaction applies a hub load force to said rotatable member at an angle with respect to said radius;
said range of angular positions of said pivot structure including a potential tooth skip position, said tensioner being constructed and arranged such that if said pivot structure were moved into said potential tooth skip position under driving element tension and then the tension in said driving element were decreased, tooth skip would be allowed to occur between said driving element and said engine if said spring structure failed to move said pivot structure in said tension applying direction to maintain said rotatable member in said tension applying relationship with said driving element;
said tensioner being constructed and arranged such that the mean dynamic tension of said driving element required to pivot said pivot structure in said opposite direction towards and into said potential tooth skip position is greater than the aforesaid maximum tension said engine is capable of applying to said driving element.

41. A combination according to claim 40, wherein said engine is adapted to thermally expand from an initial condition to a hot engine condition due to an increase in engine temperature during operation;
said tensioner being mounted on said engine such that when said engine is in said initial condition said pivot structure is angularly positioned at an initial angular positions said spring structure applying said tensioning torque to said pivot structure such that said driving element is tensioned to a first mean dynamic tension when said pivot structure is in said initial angular position thereof;
said engine and said driving element being constructed and arranged such that as said engine thermally expands to said hot engine condition the mean dynamic tension in said driving element increases so that the hub load force applied by said driving element pivots said pivot structure in a return direction said tension applying direction away from said initial angular position thereof to a hot engine angular position, said hot engine angular position being spaced from said potential tooth skip position in said tension applying direction, said spring structure applying said tensioning torque to said pivot structure such that said driving element is tensioned to a second mean; dynamic tension when said pivot structure is in said hot engine angular position thereof;
said spring structure and said initial angular position of said pivot structure being selected such that the mean dynamic tension of said driving element required to pivot said pivot structure in said return direction from said hot engine position to said potential tooth skip position is greater than the aforesaid maximum tension said engine is capable of applying to said driving element.

42. A combination according to claim 41, wherein said initial angular position of said pivot structure is selected with respect to a perpendicular angular position at which said hub load force would be applied to said rotatable member perpendicularly to said radius such that said hot engine angular position of said pivot structure is spaced in said return direction from said perpendicular angular position so that the mean dynamic tension of said driving element required to continue pivoting said pivot structure in said return direction from said hot engine position thereof continually increases as a result of the angle between said hub load force and said radius continually increasing and said spring structure being continually increasingly stressed the further said pivot structure is pivoted in said return direction from said hot engine position.

43. A combination according to claim 42, wherein said initial angular position is spaced in said return direction from said perpendicular angular position such that, as said pivot structure is pivoted from said initial angular position thereof to said hot engine angular position thereof, the angle between said hub load force and said radius continually increases and said spring structure is continually increasingly stressed so that the mean dynamic tension in said driving element continually increases from said first mean dynamic tension to said second mean dynamic tension during the thermal expansion of said engine.

44. A combination according to claim 43, wherein said initial angular position is spaced at least 5 degrees from said perpendicular angular position in said return direction.

45. A combination according to claim 44, wherein said initial angular position is spaced at least 10 degrees from said perpendicular angular position in said return direction.

46. A combination according to claim 40, further comprising damping structure constructed and arranged to resist pivotal movement of said pivot structure about said pivot axis in both said tension applying and said return directions thereof.

47. A combination according to claim 46, wherein said damping structure frictionally resists pivotal movement of said pivot structure about said pivot axis in both said tension applying and return directions thereof.

48. A combination according to claim 40, wherein said spring structure comprises a torsion spring.

49. A combination according to claim 40, wherein said endless driving element is an endless flexible belt and wherein said rotatable member is a pulley member engaging said belt in said tension applying relationship.

50. A combination according to claim 49, wherein said belt is a timing belt.

51. A combination according to claim 40, wherein said endless driving element is an endless flexible chain and wherein said rotatable member is a sprocket member intermeshingly engaging said chain in said tension applying relationship.

52. A combination according to claim 51, wherein said chain is a timing chain.

53. A combination according to claim 40, wherein said tensioner comprises a stop, said stop being positioned with respect to said pivot structure such that said pivot structure engages said stop while pivoting in said return direction.

54. A combination according to claim 40, wherein said tensioner is devoid of a stop that restricts pivotal movement of said pivot structure in said return direction.

55. A combination according to claim 40, further comprising an operative component and wherein said engine comprises a crankshaft that drives said endless driving element, said driving element being engaged with said operative component such that engine driven movement of said driving element operates said component, said operative component being located between said tensioner and said engine crankshaft in a normal downstream running direction of said driving element which occurs when said crankshaft is turning in a normal forward rotating direction,
   said engine being constructed and arranged such that said crankshaft can be turned in a reverse rotating direction, said engine and said driving element being constructed and arranged such that during the turning of said engine crankshaft in the reverse rotating direction said engine is capable of applying a reverse operation maximum tension to said driving element to an reverse operation;
   said tensioner being constructed and arranged such that the mean dynamic tension of said driving element required to pivot said pivot structure towards and into said potential tooth skip position is greater than the aforesaid reverse operating maximum tension said engine is capable of applying to said driving element.

56. A combination according to claim 55, wherein said engine is adapted to thermally expand from an initial condition to a hot engine condition due to an increase in engine temperature during operation;
   said tensioner being mounted on said engine such that when said engine is in said initial condition said pivot structure is angularly positioned at an initial angular position, said spring structure applies said tensioning torque to said pivot structure such that said driving element is tensioned to a first mean dynamic tension when said pivot structure is in said initial angular position thereof;
   said engine and said driving element being constructed and arranged such that as said engine thermally expands to said hot engine condition the mean dynamic tension in said driving element increases so that the hub load force applied by said driving element pivots said pivot structure in a return direction opposite said tension applying direction away from said initial angular position thereof to a hot engine angular position, said hot engine angular position being spaced from said potential tooth skip position in said tension applying direction, said spring structure applying said tensioning torque to said pivot structure such that said driving element is tensioned to a second mean dynamic tension when said pivot structure is in said hot engine angular position thereof.

57. A combination according to claim 56, wherein said initial angular position of said pivot structure is selected with respect to a perpendicular angular position at which said hub load force would be applied to said rotatable member perpendicularly to said radius such that said hot engine angular position of said pivot structure is spaced in said return direction from said perpendicular angular position so that the mean dynamic tension of said driving element required to continue pivoting said pivot structure in said return direction from said hot engine position thereof continually increases as a result of the angle between said hub load force and said radius continually increasing and said spring structure bring continually increasingly stressed the further said pivot structure is pivoted in said return direction from said hot engine position.

58. A combination according to claim 57, wherein said initial angular position is spaced in said return direction from said perpendicular angular position such that, as said pivot structure is pivoted from said initial angular position thereof to said hot engine angular position thereof, the angle between said hub load force and said radius continually increases and said spring structure is continually increasingly stressed so that the mean dynamic tension in said driving element continually increases from said first mean dynamic tension to said second mean dynamic tension during the thermal expansion of said engine.

59. A combination according to claim 58, wherein said initial angular position is spaced at least 5 degrees from said perpendicular angular position in said return direction.

60. A combination according to claim 59, wherein said initial angular position is spaced at least 10 degrees from said perpendicular angular position in said return direction.

61. A method for making a tensioner for installation on a vehicle engine adapted to drive an endless flexible driving element, said engine being capable of applying a maximum tension to said driving element during operation thereof; said tensioner when assembled comprising a fixed structure constructed and arranged to be mounted on said engine, a pivot structure pivotally mounted on said fixed structure for pivotal movement about a pivot axis within a range of angular positions, spring structure constructed and arranged to apply a tensioning torque to said pivot structure that tends to pivot said pivot structure in a tension applying direction within said range of angular positions, and a rotatable member rotatably mounted on said pivot structure for rotation about a rotational axis spaced radially from said pivot axis by a radius, said rotatable member being constructed and arranged to engage said driving element in a tension applying relationship such that said driving element is tensioned and in reaction applies a hub load force to said rotatable member at an angle with respect to said radius; when said tensioner is mounted on said engine said range of angular positions of said pivot structure including an initial angular position and a potential tooth skip position spaced in a return direction opposite said tension applying direction away from said initial angular position, said initial angular position being the angular position of said pivot structure when said engine is in an initial condition at ambient temperature, said potential tooth skip angular position being the angular position of said pivot structure whereat if said pivot structure were moved into said potential tooth skip position under driving element tension and then the tension in said driving element were decreased, tooth skip would be allowed to occur between said driving element and said engine if said spring structure failed to move said pivot structure in said tension applying direction to maintain said rotatable member in said tension applying relationship with said driving element, said method comprising:

selecting said spring structure and said initial angular position with respect to said potential tooth skip position such that a mean dynamic tension of said driving element required to pivot said pivot structure in said return direction towards and into said potential tooth skip position is greater than the aforesaid maximum tension said engine is capable of applying to said driving element;

pivotally mounting said pivot structure to said fixed structure; and connecting said spring structure to said spring structure so as to enable said spring structure to apply said tensioning torque to said pivot structure when said tensioner is installed.

62. A method according to claim 61, wherein said tensioner when assembled further comprises a damping structure constructed and arranged to resist pivotal movement of said pivot structure about the pivot axis thereof and wherein said selecting comprises selecting said spring structure, said damping structure, and said initial angular position with respect to said potential tooth skip position such that a mean dynamic tension of said driving element required to pivot said pivot structure in said return direction towards and into said potential tooth skip position is greater than the aforesaid maximum tension said engine is capable of applying to said driving element; said method further comprising:

mounting said damping structure in damping relation with respect to said pivot structure.

63. A tensioner for use with a vehicle engine and an endless flexible driving element driven by said engine, said engine being capable of applying a maximum tension to said driving element during operation thereof, said tensioner comprising:

a fixed structure constructed and arranged to be mounted on said engine;

a pivot structure pivotally mounted on said fixed structure for pivotal movement about a pivot axis within a range of angular positions;

spring structure constructed and arrange to apply a tensioning torque to said pivot structure that tends to pivot said pivot structure in a tension applying direction within said range of angular positions;

a rotatable member rotatably mounted on said pivot structure for rotation about a rotational axis spaced radially from said pivot axis by a radius, said rotatable member being adapted to engage said driving element in a tension applying relationship such that said driving element is tensioned and in reaction applies a hub load force to said rotatable member at an angle with respect to said radius;

said tensioner being constructed and arranged to be installed while said engine is in an initial condition with said pivot structure in an initial angular position of said range of angular positions and said rotatable member engaging said driving element;

when said tensioner is installed said range of angular positions of said pivot structure including a potential tooth skip position spaced in a return direction opposite said tension applying direction, said potential tooth skip position being an angular position whereat if said pivot structure were moved into said potential tooth skip position under driving element tension and then the tension in said driving element were decreased, tooth skip would be allowed to occur between said driving element and said engine if said spring structure failed to move said pivot structure in said tension applying direction to maintain said rotatable member in said tension applying relationship with said driving element;

said spring structure and said initial angular position being selected such that the mean dynamic tension of said driving element required to pivot said pivot structure in said return direction towards and into said potential tooth skip position is greater than the aforesaid maximum tension said engine is capable of applying to said driving element.

64. A tensioner for use with a vehicle engine and an endless flexible driving element driven by said engine said engine being adapted to thermally expand from an initial condition at an ambient temperature to a hot engine condition due to an increase in engine temperature during engine operation, said engine and said driving element being constructed and arranged such that as said engine thermally expands to said hot engine condition the mean dynamic tension in said driving element increases, said tensioner comprising a fixed structure constructed and arranged to be mounted on said engine;

a pivot structure pivotally mounted on said fixed structure for pivotal movement about a pivot axis;

spring structure constructed and arranged to apply a tensioning torque to said pivot structure that tends to pivot said pivot structure in a tension applying direction;

a maximum travel stop constructed and arranged to engage said pivot structure pivoting in a return direction opposite said tension applying direction thereof to thereby prevent further pivotal movement of said pivot structure in said return direction and provide said pivot structure with a maximum travel angular position;

a rotatable member rotatably mounted on said pivot structure for rotation about a rotational axis spaced radially from said pivot axis by a radius, said rotatable member being adapted to engage said driving element in a tension applying relationship such that said driving element is tensioned and in reaction applies a hub load force to said rotatable member at an angle with respect to said radius;

said tensioner being constructed and arranged to be mounted on said engine such that when said engine is in said initial condition said pivot structure is angularly positioned at an initial angular position, said spring structure being adapted to apply said tensioning torque to said pivot structure such that said driving element is tensioned to a first mean dynamic tension when said pivot structure is in said initial angular position thereof;

said tensioner being constructed and arranged such that the hub load force applied by said driving element pivots said pivot structure in said return direction away from said initial angular position thereof to a hot engine angular position, said spring structure being adapted to apply said tensioning torque to said pivot structure such that said driving element is tensioned to a second mean dynamic tension when said pivot structure is in said hot engine angular position thereof;

said spring structure and said initial angular position of said pivot structure being selected such that the mean dynamic tension of said driving element required to pivot said pivot structure in said return direction from said hot engine position to said maximum travel angular position continually increases in such a manner that the mean dynamic tension required to move said pivot structure from said hot engine position to said maximum travel position is at least 75% greater than said second mean dynamic tension.

65. A combination comprising:

a vehicle engine adapted to thermally expand from an initial condition at an ambient temperature to a hot engine condition due to an increase in engine temperature during engine operation;

an endless flexible driving element driven by said engine;

a tensioner comprising:
  a fixed structure mounted on said engine;
  a pivot structure pivotally mounted on said fixed structure for pivotal movement about a pivot axis;
  spring structure constructed and arranged to apply a tensioning torque to said pivot structure that tends to pivot said pivot structure in a tension applying direction;
  a rotatable member rotatably mounted on said pivot structure for rotation about a rotational axis spaced radially from said pivot axis by a radius, said rotatable member engaging said driving element in a tension applying relationship such that said driving element is tensioned and in reaction applies a hub load force to said rotatable member at an angle with respect to said radius;

said tensioner being mounted on said engine such that when said engine is in said initial condition said pivot structure is angularly positioned at an initial angular position spaced from a perpendicular angular position at which said hub load force would be applied to said rotatable member perpendicular to said radius said initial angular position being spaced from said perpendicular angular position in a return direction opposite said tension applying direction.

* * * * *